Sept. 24, 1968      A. N. SWEENY      3,402,625
ADJUSTABLE CUTTING TOOL
Filed Oct. 12, 1966
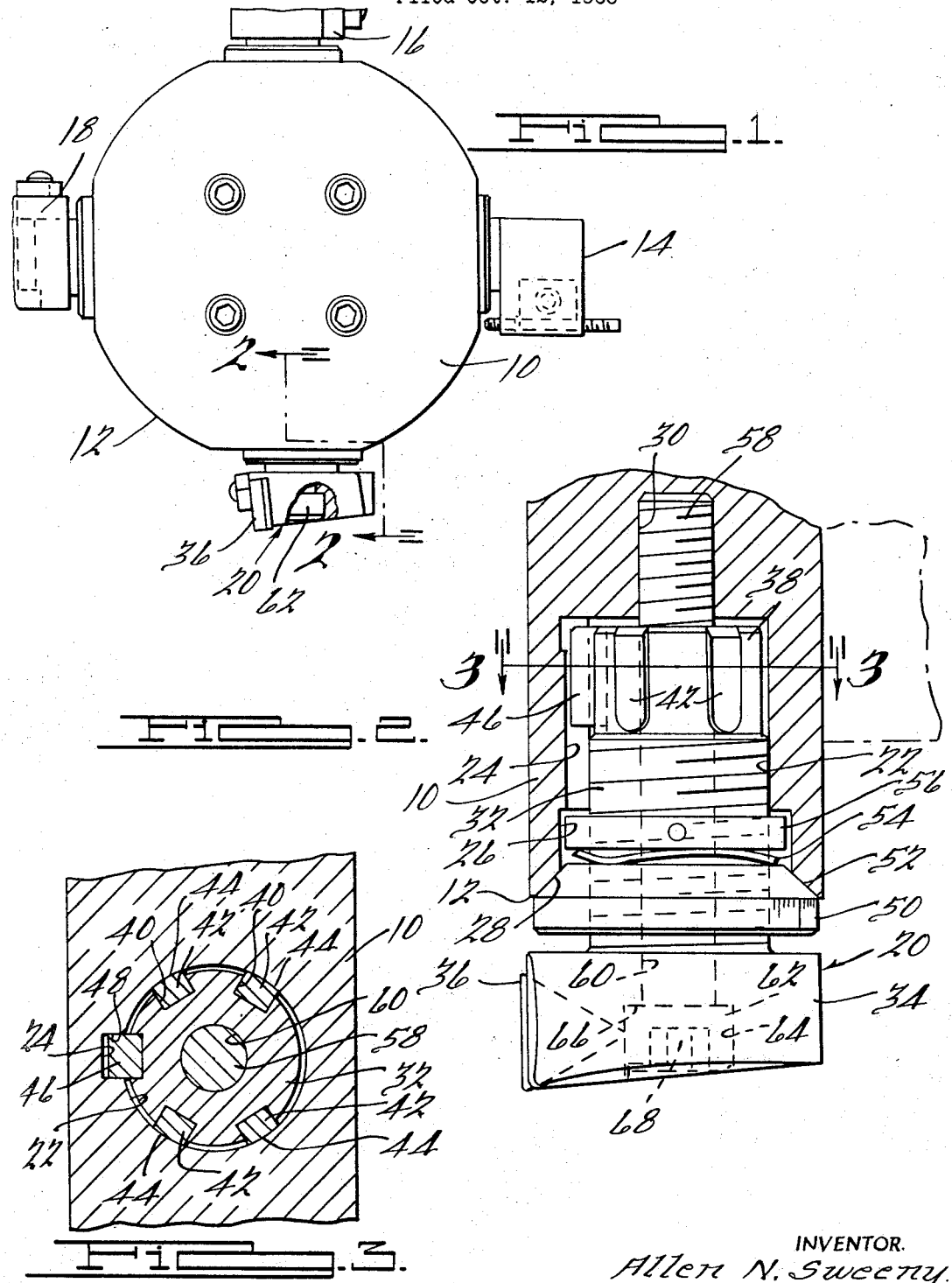
INVENTOR.
Allen N. Sweeny.
BY
Harness, Dickey + Pierce
ATTORNEYS.

United States Patent Office 3,402,625
Patented Sept. 24, 1968

3,402,625
ADJUSTABLE CUTTING TOOL
Allen N. Sweeny, Grosse Pointe Farms, Mich., assignor to De Vlieg Machine Company, Royal Oak, Mich., a corporation of Michigan
Filed Oct. 12, 1966, Ser. No. 586,263
6 Claims. (Cl. 82—36)

This invention relates to cutting tools and particularly be described, other logical results represented by circuit to an adjustable cutting tool assembly.

It is an object of the inpresent invention to provide an adjustable cutting tool which is operable to very accurately support a cutter, which is readily adjustable to position the cutter in a selected location which is easily mounted on a turret or other mounting member where access is not available to the rear end of the cutting tool, which is relatively inexpensive to manufacture, which is of rugged manufacture, and which provides an improved clamping or locking arrangement that is accessible from the front of the tool.

These and other objects of the present invention will become apparent from the following detailed description taken in conjunction with the accompanying drawings, wherein:

FIGURE 1 is an end elevational view of a machine tool turret having a plurality of cutting tools made according to the present invention mounted thereon;

FIGURE 2 is an enlarged sectional view of the structure illustrated in FIG. 1, taken along the line 2—2 thereof; and FIGURE 3 is a sectional view of the structure illustrated in FIGURE 2 taken along the line 3—3 thereof.

The adjustable cutting tool of the present invention may be used with a wide variety of machine tools where the mounting location of the tool does not provide access to the rear end of the tool. Such machine tools may include boring and facing machines, chucking machines, screw machines and a wide variety of other machines in which either the work or the tool is moved or driven in rotation. The structure illustrated in FIGURE 1 constitutes only one representative environment for the cutting tool assembly and will be seen to include a mounting member or turret 10 that is indexed about an axis perpendicular to the plane of the sheet. Mounted adjacent the outer periphery 12 of the turret 10 are a plurality of adjustable cutting tools 14, 16, 18 and 20. Each of the cutting tools 14 embodies the present invention, and a description of the cutting tool 20 will serve to describe the present invention. The cutting tool 20 is illustrated in detail in FIGURES 2 and 3.

By reference to FIGURE 2 it will be seen that the turret or mounting member 10 has a bore 22 from which the cutting tool 20 projects. The bore 22 is provided with a longitudinally extending keyway 24 along one side thereof and with a counterbore 26 which is surrounded at one end thereof by a conical annular seat 28 that is contiguous to the outer periphery 12 of the turret 10. The rear end of the bore 22 is provided with a reduced diameter threaded blind bore 30 disposed coaxially with the bore 22.

A tool support in the form of a threaded body or shank 32 is closely fitted within the bore 22 and is provided with an enlarged head 34 that serves to carry a cutter 36. The body 32 has a reduced diameter rear terminal portion 38 provided with a plurality of grooves 40 therein. The grooves 40 serve to receive wear strips 42 having outer peripheries 44 disposed on a common circular cylinder and conformably engageable with the wall of the bore 22. The wear strips 42 position the rear end of the body 32 so that it is coaxial with but slidable in the bore 22. Rotation of the body 32 with respect to the member 10 is prevented by a key 46 carried by the body 32 and slidable in a keyway 48 formed in the wall of the bore 22 and extending axially thereof. Accordingly, the body 32 is nonrotatably supported for axial sliding movement within the bore 22.

An adjusting collar 50 of annular internally threaded shape is threaded onto the body 32 and is provided with a conical surface 52 conformably engageable with the conical seat 28 of the member 10. The engaging conical surface 52 and seat 28 are coaxial with the bore 22, and the collar 50 serves to very accurately position the forward end of the body 32 coaxially with respect to the bore 22. The collar 50 is graduated and such graduations may be read with respect to a reference point on the member 10. Thus, by rotating the collar 50, the body 32 may be advanced axially of the bore 22 a desired amount. The adjusting collar 50 is rotated or adjusted in order to establish the axial position of the cutter 36.

The collar 50 is maintained in a desired position of adjustment on the body 32 prior to tightening of the body 32 in position by means of a wave washer 54 which engages one side of the collar 50 and is held in compression thereagainst by a nut 56, which is also threaded on the body 32. The nut 56 and the wave washer 54 are positioned within the counterbore 26 of the member 10. The washer 54 will compress somewhat to permit rotation and adjustment of the collar 50 without resetting the nut 56.

The present invention is particularly distinguished by the provision of a locking screw 58 which is threaded into the threaded bore 30 and which extends entirely through an axial passage or bore 60 extending axially through the body 32 between its opposite ends. The screw 58 will be seen to have a head 62 which is positioned within a counterbore 64 of the bore 60 so as to abut an annular shoulder 66 located between the bore 60 and counterbore 64. The counterbore 64 is open to the forward end of the head 34 of the body 32 and has a forwardly facing wrench-engaging socket 68 adapted to receive the usual type of "Allen" wrench. It will, of course, be apparent that the bore 60 and screw 58 are coaxial with the bore 22. When the screw 58 is tightened by the engagement of a wrench in the socket 68 thereof, the threaded body 32 is drawn rearwardly by the enegagement of the head 62 with the shoulder 66. This forces the collar 50 rearwardly against the seat 28 and the axial position of the cutter 36 will be precisely located by the position of the collar 50 on the threaded body 32.

From the foregoing, it will be apparent that the construction illustrated herein enables the cutting tool 20 to be locked in position on the member 10 by access only to the forward end of the body 32 and does not require the provision of access openings or passages in the member 10 adjacent the rear end of the bore 22.

While it will be apparent that the preferred embodiment of the invention illustrated herein is well calculated to fulfill the objects above stated, it is obvious that the invention is susceptible of modification, variation and change without departing from the fair meaning or scope of the following claims.

What is claimed is:

1. An adjustable cutting tool assembly including a mounting member having a bore and a seat located at one end of said bore, a threaded tool supporting body received in said bore and projecting from said bore at the forward end thereof, interengaging means on said member and said body nonrotatably supporting said body for axially sliding movement in said bore, an adjusting collar threaded on said body and engageable with said seat to position said body axially of said bore, said body having an opeing extending axially therethrough and a locking screw extending through said opening and threadably engageable with means carried by said member, said screw having a head exposed to the forward end of said body and being operable to bias said body inwardly of said bore and hold said collar against said seat.

2. The structure set forth in claim 1, in which said head is provided with a forwardly facing wrench-receiving socket.

3. The structure set forth in claim 1, in which said opening and said screw are disposed coaxially with respect to said bore.

4. The structure set forth in claim 1, in which the opening of said body comprises a bore having a counterbore defining an annular shoulder surrounding said bore, and in which said head is engageable with said shoulder to apply a biasing force to said body.

5. The structure set forth in claim 1, including a cutter carried by said body in a location radially offset from the axis of said body.

6. The structure set forth in claim 1, in which the bore of said member has a threaded portion of reduced diameter at the rear end thereof into which said screw is threaded.

References Cited

UNITED STATES PATENTS

| | | | |
|---|---|---|---|
| 481,193 | 8/1892 | Richards | 82—36 |
| 3,232,144 | 2/1966 | Sweeny | 77—58 |

LEONIDAS VLACHOS, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,625            September 24, 1968

Allen N. Sweeny

It is certified that error appears in the above identified patent and that said Letters Patent are hereby corrected as shown below:

Column 1, line 10, cancel "be described, other logical results represented by circuit --; line 12, "inpresent" should read -- present --. Column 2, line 44, "enegagement" should read -- engagement --; line 71, "opeing" should read -- opening --.

Signed and sealed this 17th day of February 1970.

(SEAL)
Attest:

Edward M. Fletcher, Jr.           WILLIAM E. SCHUYLER, JR.

Attesting Officer                   Commissioner of Patents